United States Patent [19]

Jorgensen

[11] Patent Number: 5,731,543
[45] Date of Patent: Mar. 24, 1998

[54] CONDUIT CONNECTOR ASSEMBLY WITH END STOP GROMMET FOR ATTACHMENT OF CONDUIT TO JUNCTION BOX

[75] Inventor: Robert W. Jorgensen, Niles, Mich.

[73] Assignee: Hubbell Incorporated, Orange, Conn.

[21] Appl. No.: 654,067

[22] Filed: May 28, 1996

[51] Int. Cl.⁶ .................................................. H02G 3/18
[52] U.S. Cl. .................................. 174/65 R; 285/162
[58] Field of Search ......................... 174/65 R, 65 G, 174/151, 152 G, 153 G, 153 R, 152 R; 16/2.1, 2.2; 248/56; 285/194, 162

[56] References Cited

U.S. PATENT DOCUMENTS

| Re. 15,891 | 8/1924 | Thomas, Jr. ................... 16/2 X |
| 1,204,625 | 11/1916 | Wheelock ............... 174/152 G X |
| 2,255,971 | 9/1941 | Hall ............................... 16/2 |
| 2,465,844 | 3/1949 | Brushaber .................. 285/194 X |
| 2,736,450 | 2/1956 | Atkinson ..................... 220/3.6 X |
| 2,744,769 | 5/1956 | Roeder et al. ................. 248/56 X |
| 3,858,151 | 12/1974 | Paskert ....................... 285/162 X |
| 4,012,578 | 3/1977 | Moran et al. ..................... 174/51 |
| 4,021,604 | 5/1977 | Dola et al. ........................ 174/51 |
| 4,711,472 | 12/1987 | Schnell .................... 174/153 G X |
| 4,880,387 | 11/1989 | Stikeleather et al. ............... 439/98 |
| 4,990,721 | 2/1991 | Sheehan ............................ 174/65 |
| 5,171,164 | 12/1992 | O'Neil et al. .................... 439/552 |
| 5,204,499 | 4/1993 | Favalora ......................... 174/65 R |
| 5,276,280 | 1/1994 | Ball ................................ 174/65 R |
| 5,285,013 | 2/1994 | Schnell et al. .................. 174/65 R |
| 5,373,106 | 12/1994 | O'Neil et al. .................... 174/65 R |
| 5,422,437 | 6/1995 | Schnell .......................... 174/65 R |

*Primary Examiner*—Kristine L. Kincaid
*Assistant Examiner*—Dean A. Reichard
*Attorney, Agent, or Firm*—Jerry M. Presson; Michael R. Swartz

[57] ABSTRACT

A conduit connector assembly for attachment of a conduit carrying electrical wires to an electrical junction box includes a fitting body, an end stop grommet, and a spring clip. The fitting body has open first and second opposite ends and an interior bore for receiving therein an end portion of a conduit. The end stop grommet includes a grommet body having an interior cavity with open first and second end portions, the grommet body being inserted within the interior bore of the fitting body. The conduit is received and held within the interior bore of the fitting body and within the interior cavity of the grommet body. The fitting body is inserted through an opening in the junction box and is connected thereto. The grommet body is secured within the interior bore of the fitting body and has an outer flange making contact with the fitting body for preventing the grommet body from being inserted into the fitting body beyond a predetermined position therein. The grommet body also has an end wall having a round passage therethrough to prevent the conduit from entering farther into the junction box but permits wiring from the conduit to pass into the junction box. The spring clip retains the conduit within the fitting body and cooperates with the fitting body for connection of the assembly to the junction box.

19 Claims, 4 Drawing Sheets

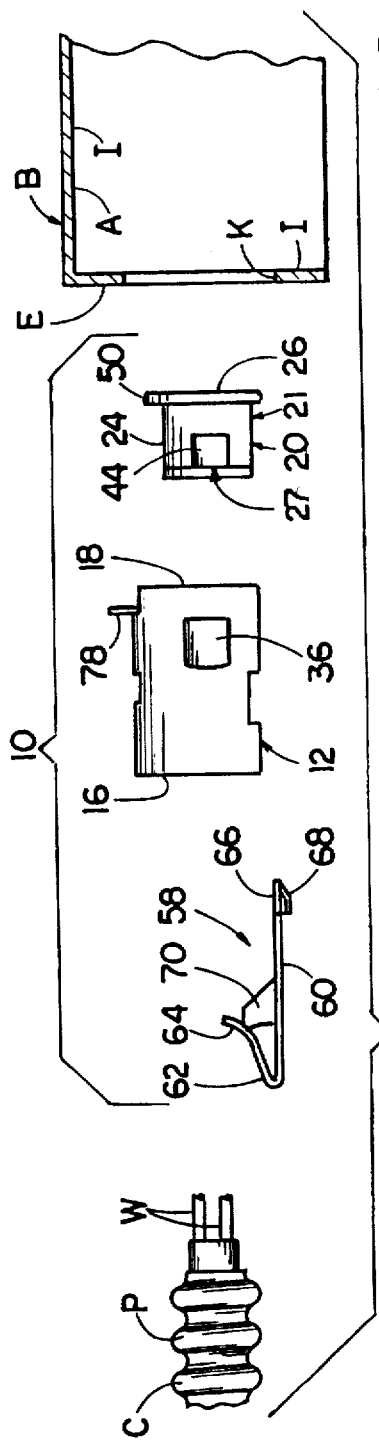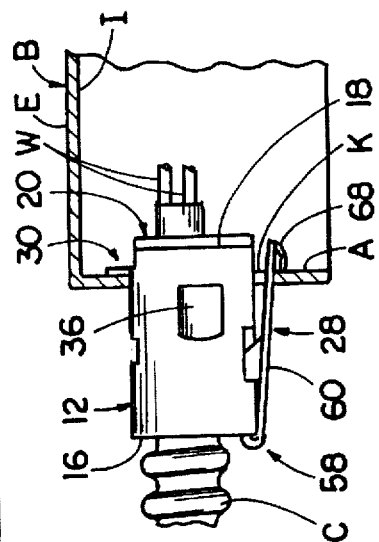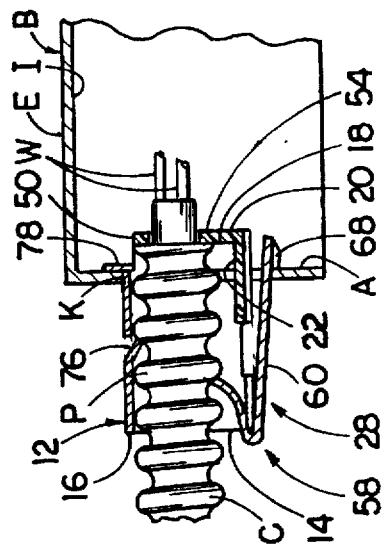

CONDUIT CONNECTOR ASSEMBLY WITH END STOP GROMMET FOR ATTACHMENT OF CONDUIT TO JUNCTION BOX

BACKGROUND OF THE INVENTION

1. Field of the Invention

The present invention generally relates to conduit connector devices and, more particularly, is concerned with a conduit connector assembly having a fitting body and end stop grommet for connecting a flexible metal conduit or metal cables carrying electrical wires to an electrical junction box.

2. Description of the Prior Art

Electrical wiring is used for the connection of main electrical power lines and electrical outlets in order to provide access to electrical power in residential and commercial buildings and the like. Electrical junction boxes are provided in the buildings to receive portions of the electrical wiring and contain and isolate therein splices in the wiring which extends from the junction boxes to the main electrical power lines and to outlets and switches in the building. For protection of the electrical wiring, the wiring is generally housed and carried within metal conduits or metal cables (hereafter referred to as conduit). It is also desirable to connect ends of the metal conduits to the electrical junction boxes.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleather et al., U.S. Pat. No. 4,990,721 to Sheehan, U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

One such device produced and sold by Hubbell, Incorporated, of Orange, Conn., includes a fitting body having an interior bore with four integral end tabs folded ninety degrees to serve as an end stop at a first opposite end of the fitting body for insertion into an electrical junction box and a spring clip for attachment at the bottom of a second opposite end of the fitting body for gripping a conduit carrying electrical wires inserted within the fitting body. While this prior art Hubbell conduit connector device has performed with satisfaction over the years and has met objectives it was originally designed to achieve, the device does not meet current performance standards. As in the case of any product, over time improvements are required.

Consequently, a need exists for improvement of the prior art Hubbell conduit connector device which meets current performance standards and yet is economical to manufacture.

SUMMARY OF THE INVENTION

The present invention provides a conduit connector assembly for connecting a conduit carrying electrical wires to an electrical junction box which is generally used to receive electrical wiring whenever an outlet, switch, or access to splices is desired in a building. The conduit connector assembly of the present invention is designed to satisfy the aforementioned need by providing a three-piece construction having a fitting body, an end stop grommet, and a spring clip retainer. The assembly is economical to manufacture and meets current performance standards. In particular, unlike the aforementioned prior art Hubbell conduit connector device having the four folded tabs which fail to provide a suitably configured wire passageway, the end stop grommet of the assembly of the present invention provides a smooth round passage for routing of the electrical wires emanating from the end of the conduit into the junction box.

Accordingly, the present invention is directed to a conduit connector assembly for connecting a conduit carrying electrical wires to an electrical junction box. The assembly comprises: (a) a fitting body having a pair of open first and second opposite ends and an interior bore extending between the first and second opposite ends for receiving therein an end portion of a conduit carrying electrical wiring which emanates from the end portion of the conduit; (b) an end stop grommet interfitted with the fitting body, the end stop grommet being inserted into the interior bore of the fitting body and defining an interior cavity and including a pair of open first and second end portions; (c) means for securing the end stop grommet to the fitting body; (d) means for gripping the end portion of the conduit so as to hold the conduit end portion within the interior bore of the fitting body and within the interior cavity of the end stop grommet; and (e) means for connecting the fitting body to the electrical junction box. The interior bore of the fitting body is for receiving therethrough the conduit carrying electrical wiring and the second opposite end of the fitting body is for insertion through a knockout opening in the electrical junction box. The first end portion of the end stop grommet is inserted through the second opposite end of the fitting body and into the interior bore of the fitting body. The end stop grommet further has means for securing the grommet body within the fitting body and a stop element for preventing the grommet body from inserting too far into the fitting body.

More particularly, the end stop grommet is interfitted with the fitting body and includes a grommet body having a pair of open first and second end portions. The first end portion of the grommet body is inserted within the interior bore of the fitting body to a predetermined position within the interior bore of the fitting body. Also, the first end portion of the grommet body is of a first diameter size adapted to receive the end portion of the conduit therein. The end stop grommet further includes outer means on the second end portion of the grommet body defining a first stop element for preventing the grommet body from being inserted into the interior bore of the fitting body beyond the predetermined position therein. The end stop grommet still further includes inner means on the second end portion of the grommet body defining a second stop element for blocking extension of the end portion of the conduit beyond the second end portion of the grommet body. The inner means also defines an aperture of a second diameter size, less than the first diameter size and less than the diameter size of the interior cavity of the grommet body, for allowing passage of the electrical wiring emanating from the end portion of the conduit through the second end portion of the grommet body.

Still further, the gripping means includes a grip tab disposed on a first side portion of the fitting body and projecting inwardly therefrom into the interior bore of the fitting body toward the second opposite end thereof. The gripping means also includes a spring clip inserted at the first opposite end of the fitting body over a second side portion of the fitting body, opposite from the first side portion thereof. The spring clip has a grip portion disposed at a first end thereof within the interior bore of the fitting body substantially opposite from the grip tab of the fitting body.

The grip tab of the fitting body and an end point of the grip portion of the first end of the spring clip fall, on opposite sides, into convolutions formed in the external surface of the conduit and thereby cooperate to grip and secure the conduit within the interior bore of the fitting body and within the interior cavity of the end stop grommet.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an exploded side elevational view of the components of the conduit connector assembly of the present invention for attachment of a conduit carrying electrical wires to an electrical junction box.

FIG. 2 is a side elevational view of the conduit connector assembly in assembled form attaching the conduit to the electrical junction box.

FIG. 3 is a longitudinal sectional view of the assembly shown in FIG. 2.

DETAILED DESCRIPTION OF THE INVENTION

Figure 4:
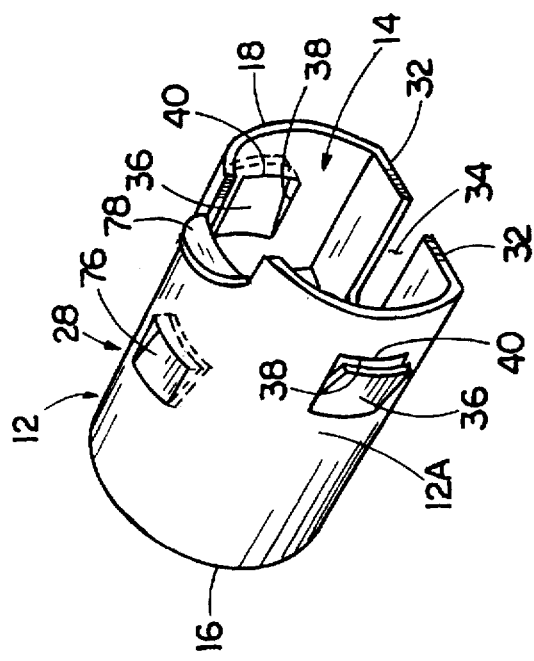
FIG. 4 is a perspective view of the fitting body of the assembly.
Figure 7:
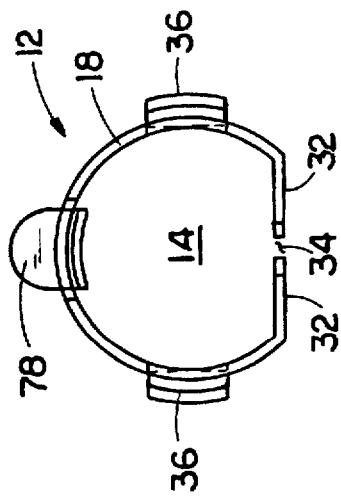
FIG. 7 is an end elevational view of the fitting body as seen along line 7—7 of FIG. 5.
Figure 6:
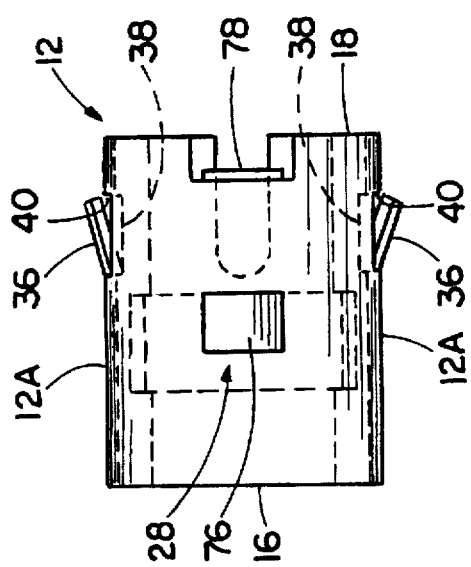
FIG. 6 is a plan view of the fitting body as seen along line 6—6 of FIG. 5.
Figure 5:
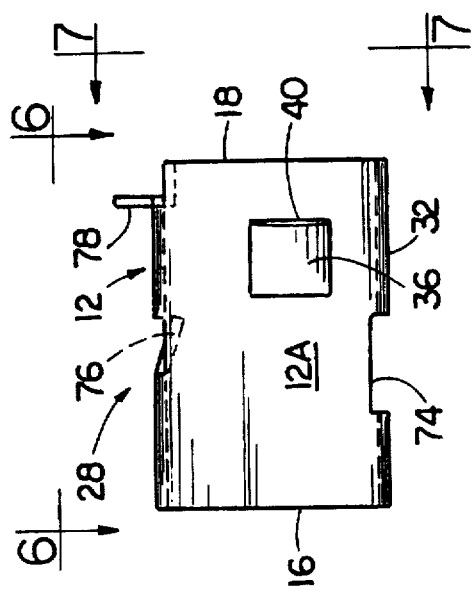
FIG. 5 is a side elevational view of the fitting body shown in FIG. 4.
Figure 10:
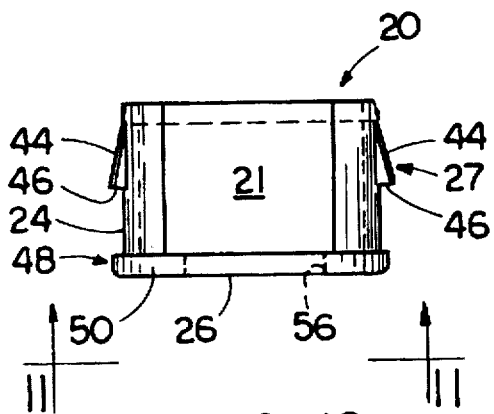
FIG. 10 is a plan view of the end stop grommet.
Figure 9:
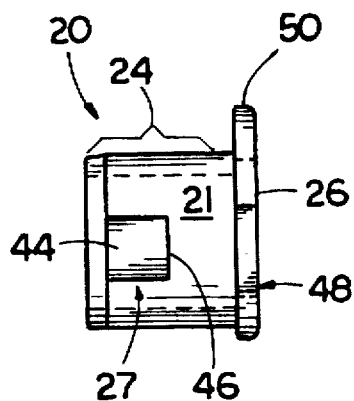
FIG. 9 is a side elevational view of the end stop grommet shown in FIG. 8.
Figure 11:
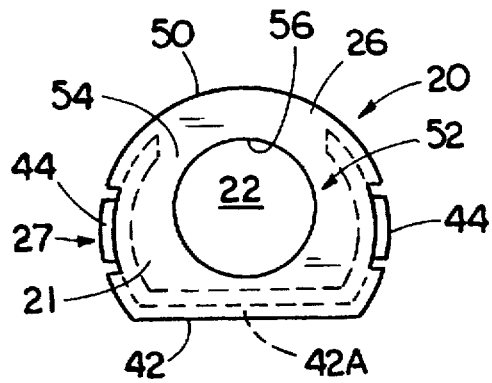
FIG. 11 is an end elevational view of the end stop grommet as seen along line 11—11 of FIG. 10.

Referring to the drawings and particularly to FIGS. 1 to 3, there is illustrated a conduit connector assembly, generally designated 10, of the present invention. The conduit connector assembly 10 is used for connecting a conduit C, normally comprised of a metal material and carrying electrical wires W, to a knockout opening K in an electrical junction box B which is used to receive electrical wiring W and contain splices made in end portions of the wiring W. The assembly 10 is designed to hold over 200 pounds without crushing the conduit C which is hollow and typically comprised substantially of thin aluminum or steel metal material.

Basically, the conduit connector assembly 10 includes a fitting body 12 defining an interior bore 14 (FIG. 4) and having a pair of open first and second opposite ends 16, 18; an end stop grommet 20 interfitted with the fitting body 12 and having a grommet body 21 defining an interior cavity 22 (FIG. 8) extending between a pair of open first and second end portions 24, 26 of the grommet body 21; the grommet body 21 being inserted at the first end portion 24 thereof into the interior bore 14 of the fitting body 12 from the second opposite end 18 of the fitting body 12 to a predetermined position therein; and securing means 27 for securing the end stop grommet 20 to the fitting body 12 in their interfitted relationship. The assembly 10 also includes gripping means 28 for securing an end portion P of the conduit C within the interior bore 14 of the fitting body 12 and within the interior cavity 22 of the grommet body 20, and connecting means 30 for securing the fitting body 12 to the junction box B.

Referring now to FIGS. 1 to 7, the fitting body 12 of the assembly 10 more particularly is preferably made from a blank of suitable metal material, such as steel, and manufactured by any suitable conventional technique, such as by being rolled over a form, to provide the fitting body 12 with a substantially cylindrical shape longitudinally truncated by a flat side portion 32. The fitting body 12 has a longitudinal slit 34 extending the full length through the longitudinal center of the flat side portion 32 thereof. During assembling of the end stop grommet 20 to the fitting body 12, the longitudinal slit 34 allows the fitting body 12 to be transversely expanded and open wide enough across the slit 34 for insertion of the first end portion 24 of the grommet body 21 into the interior bore 14 of the fitting body 12 and then to contract and close over and thereby capture the first end portion 24 of the grommet body 21 within the interior bore 14 of the fitting body 12. The fitting body 12 further has a pair of outwardly extending securing tabs 36 formed out of wall portions 12A of the fitting body 12 on opposite sides thereof. Formation of each securing tab 36 leaves a substantially rectangular opening 38 in each of the side wall portions 12A of the fitting body 12. As will become clear below, the openings 38 are part of the securing means 27 of the assembly 10 which are provided for securing the end stop grommet 20 to the fitting body 12. Each opening 38 has an edge portion 40 extending therealong and facing in a first direction toward the first opposite end 16 of the fitting body 12.

Figure 8:
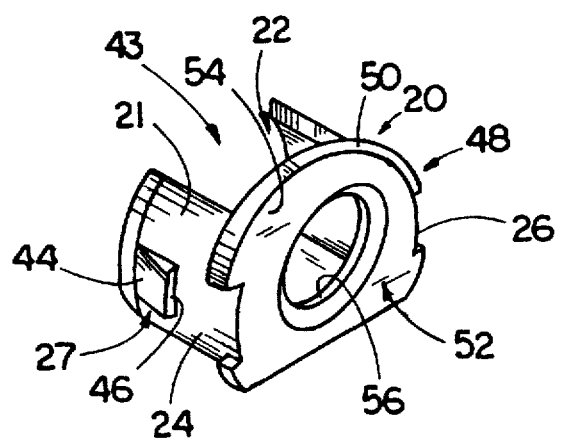
FIG. 8 is a perspective view of the end stop grommet of the assembly.
Figure 14:
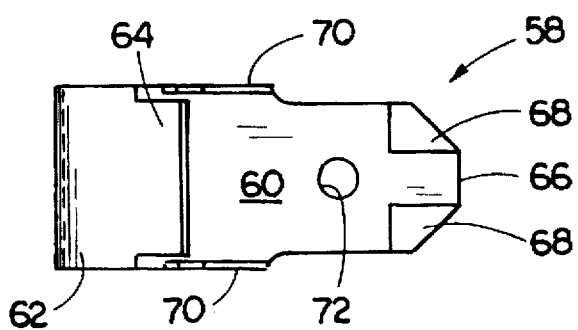
FIG. 14 is a top plan view of the spring clip as seen along line 14—14 of FIG. 13.
Figure 13:
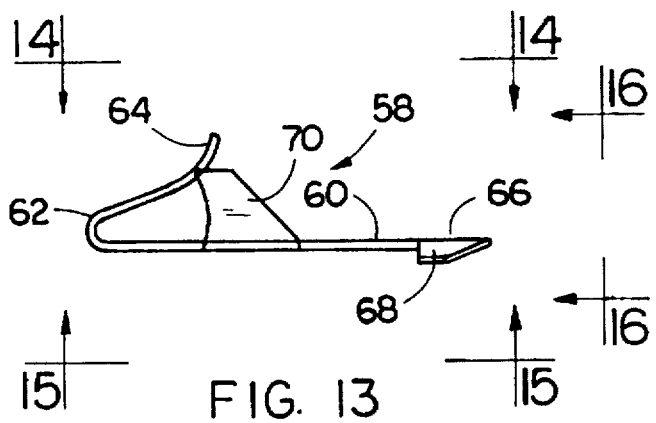
FIG. 13 is a side elevational view of the spring clip shown in FIG. 12.
Figure 16:
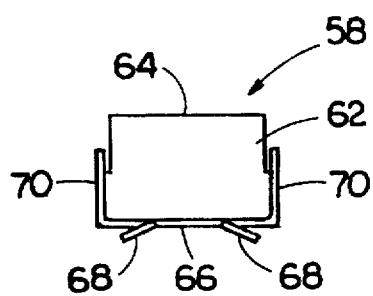
FIG. 16 is an end view of the spring clip as seen along line 16—16 of FIG. 13.
Figure 15:
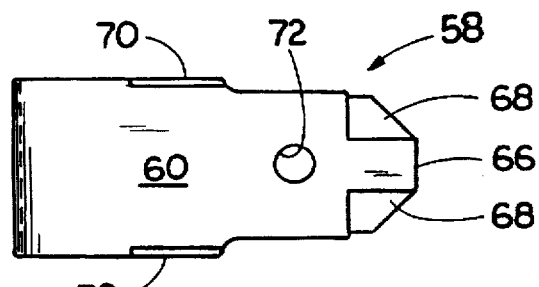
FIG. 15 is a bottom plan view of the spring clip as seen along line 15—15 of FIG. 13.
Figure 12:
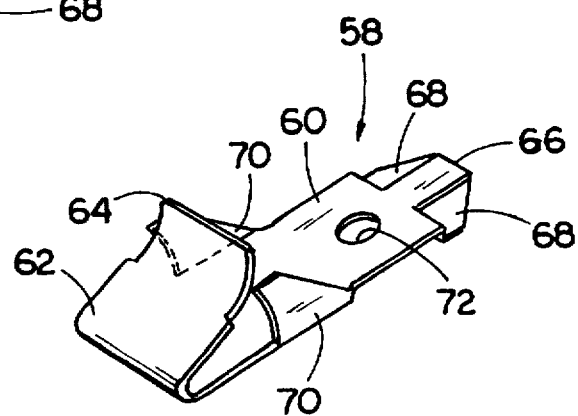
FIG. 12 is a perspective view of the spring clip of the assembly.

Referring now to FIGS. 1 to 3 and 8 to 11, the end stop grommet 20 of the assembly 10 is preferably fabricated of a plastic material formed by any suitable conventional technique, such as injection molding, into a substantially annular shape longitudinally truncated by a flat side portion 42. The end stop grommet 20 has a general configuration which is substantially similar to that of the fitting body 12 in transverse cross-section but with the first end portion 24 of the grommet body 21 having a diameter size slightly less than that of the fitting body 12 for allowing the first end portion 24 of the grommet body 21 to fit within the interior bore 14 of the fitting body 12. As best seen in FIG. 8, the grommet body 21 also includes a longitudinal slit 43, opposite the flat side portion 42, for allowing the first end portion 24 of the grommet body 21 to transversely deform to allow insertion of the first end portion 24 of the grommet body 21 into the interior bore 14 of the fitting body 12. The other part of the securing means 27 is a pair of locking tabs 44 rigidly attached to and disposed on opposite sides of the first end portion 24 of the grommet body 21 and projecting outwardly therefrom. Each locking tab 44 has an edge 46 facing in a second direction toward the second opposite end 18 of the fitting body 12 opposite from the first direction faced by the edge portion 40 of one of the openings 38 in the fitting body 12. The locking tabs 44 are brought into locking engagement with the edge portions 40 of openings 38 in the fitting body 12 upon insertion of the first end portion 24 of the grommet body 21 into the interior bore 14 of the fitting body 12 from the second opposite end 18 thereof to the predetermined position within the interior bore 14, as seen in FIGS. 2 and 3. The engagement of the grommet body locking tab edges 46 with the fitting body opening edge portions 40 enables the fitting body 12 and the end stop grommet 20 to be interfitted to one another in a snap-fit relationship. Also, the flat side portion 42 of the end stop grommet 20 has a substantially rectangular longitudinal relief portion 42A which is disposed in the same plane as the flat side 32 of the fitting body 12 upon insertion of the end stop grommet 20 into the interior bore 14 of the fitting body 12.

The second end portion 26 of the grommet body 21 of the end stop grommet 20 has outer means 48 defining a first stop element for preventing the grommet body 21 from being inserted into the interior bore 14 of the fitting body 12 beyond the predetermined position therein. Preferably, the outer means 48 defining the first stop element takes the form of an outer flange 50 at the second end portion 26 of the grommet body 21 which extends radially outwardly beyond the grommet body 21 and makes flush contact with the fitting body 12 at the second opposite end 18 thereof which is fitted over the grommet body 21. Thus, it can be appreciated, that the outer flange 50 prevents the grommet body 21 from being inserted too far into the interior bore 14 of the fitting body 12, whereas, the flat side portion 42 of the end stop grommet 20 in conjunction with the locking tabs 44 of the grommet body 21 that lock into the openings 38 of the fitting body 12 prevent the end stop grommet 20 from twisting within and withdrawing from the interior bore 14 of the fitting body 14.

Further, the second end portion 26 of the grommet body 21 of the end stop grommet 20 also has inner means 52 defining a second stop element for blocking the end portion P of the conduit C from extending or projecting through the second end portion 26 of the grommet body 21. Preferably, the inner means 52 defining the second stop element takes the form of an end wall 54 disposed inwardly from the outer flange 50 at the second end portion 26 of the grommet body 21 for retaining the end portion P of the conduit C within the interior cavity 22 and thereby preventing the end portion P of the conduit C from extending further into the electrical junction box B. The end wall 54 of the grommet body 21 also defines an aperture 56 through the second end portion 26 of the grommet body 21 in the form of a round passage 56 therethrough for permitting the electrical wiring W emanating from the end portion P of the conduit C to pass into the electrical junction box B. The first end portion 24 of the grommet body 21 defining the interior cavity 22 has a first diameter size adapted to receive the end portion P of the conduit C, whereas, the aperture or round passage 56 has a second diameter size, less than the first diameter size and less than the diameter size of the interior cavity 22 of the grommet body 21, for allowing the passing of the electrical wiring W through the second end portion 26 of the grommet body 21. Furthermore, the round passage 56 is both off-centered (relative to the end wall 54 and also to the knockout opening K of box B) and smooth for permitting the electrical wiring W from the conduit C to align with and pass through without snagging or hanging up on the electrical junction box B.

Referring now to FIGS. 1–3 and 12 to 16, the gripping means 28 of the assembly 10 includes a spring clip 58 which per se is identical to that used in the prior art Hubbell conduit connector device. The spring clip 58 is preferably made from a suitable flat sheet of metal material, such as steel, and manufactured, using a suitable conventional forming technique, so as to include a generally flat main body portion 60 having a first generally J-shaped curved end 62 terminating in a gripping end portion 64 which is curved away from the flat main body portion 60, and a second end 66 having a pair of opposite corner ears 68 formed to extend outwardly at acute angles to the main flat body portion 60 in an opposite direction therefrom compared to the direction in which the first curved end 62 extends therefrom. The spring clip 58 also includes a pair of middle side fins 70 attached along opposite sides of the flat main body portion 60 intermediately between the opposite ends 62, 66 and extending outwardly toward the gripping end portion 64 of the first curved end 62. The spring clip 58 is attachable to the fitting body 12 along the flat side portion 32 thereof by being inserted from the first opposite end 16 over the flat side portion 32 of the fitting body 12. The spring clip 58 also has a hole 72 formed through its flat main body portion 60 at a location between the middle side fins 70 and the second end 66 thereof.

Referring now to FIGS. 1 to 16, in order to provide for installment and securement of the spring clip 58 to the fitting body 12, the fitting body 12 has a pair of opposite recesses 74 (FIG. 5) on opposite sides of the longitudinal slit 34 along the flat side portion 32 thereof. The recesses 74 and slit 34 together have a width extending transversely across the flat side portion 32 of the fitting body 12 which is greater than a width across the flat main body portion 60 of the spring clip 58 so that the recesses 74 can receive therethrough the middle side fins 70 on the spring clip 58 upon the insertion of the flat side portion 32 at the first end 16 of the fitting body 12 between the middle side fins 70 and the gripping end portion 64 of the first curved end 62 of the spring clip 58. This means of securement of the spring clip 58 to the fitting body 12 permits the spring clip 58 to pivot at the first curved end 62 thereof toward and away from the flat side portion 32 of the fitting body 12.

The gripping means 28 of the assembly 10 also includes a grip tab 76 (FIG. 5) disposed on the fitting body 12 opposite from the flat side portion 32 thereof and projecting inwardly into the interior bore 14 of the fitting body 12. As best seen in FIG. 3, the grip tab 76 of the fitting body 12 and the gripping end portion 64 of the spring clip 58 fall into opposite sides of convolutions formed in the external surface of the conduit C and thereby cooperate together to grip and secure the conduit C within the interior bore 14 of the fitting body 12.

The connecting means 30 of the assembly 10 for connecting the fitting body 12 to the electrical junction box B includes the pair of securing tabs 36 of the fitting body 12 making contact with an exterior side E of a wall A of the electrical junction box B adjacent to the knockout opening K thereof where the fitting body 12 is received therethrough; a connecting tab 78 attached to and disposed on the fitting body 12 opposite from the flat side portion 32 thereof and projecting outwardly therefrom and in substantially perpendicular relation to the fitting body 12 adjacent to the second end 18 thereof and making flush contact with an interior side I of the wall A of the electrical junction box B adjacent to the knockout opening K thereof; and the pair of corner ears 68 at the second end 66 of the spring clip 58 making contact with the interior side I of the wall A of the electrical junction box B adjacent to the knockout opening K thereof. The connecting tab 78 of the fitting body 12, the corner ears 68 of the spring clip 58, and the pair of securing tabs 36 of the fitting body 12 cooperate together to releasably connect the assembly 10 to the electrical junction box B upon insertion of the second opposite end 18 of the fitting body 12 through the knockout opening K and into the electrical junction box B.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

I claim:

1. A conduit connector assembly for attachment of a conduit carrying electrical wires to an electrical junction box, said assembly comprising:
   (a) a fitting body having open first and second opposite ends and an interior bore extending between said first and second opposite ends for receiving therein from said first opposite end an end portion of a conduit carrying electrical wiring which emanates from the end portion of the conduit, said fitting body at said second opposite end being insertable through an opening in an electrical junction box;
   (b) an end stop grommet interfitted with said fitting body, said end stop grommet including
      (i) a grommet body having open first and second end portions and defining an interior cavity extending between said first and second end portions, said first end portion of said grommet body being inserted within said interior bore of said fitting body from said second opposite end thereof to a predetermined position within said interior bore of said fitting body, said first end portion of said grommet body being of a first diameter size adapted to receive the end portion of the conduit therein,
      (ii) outer means on said second end portion of said grommet body defining a first stop element for preventing said grommet body from being inserted into said interior bore of said fitting body beyond said predetermined position, and
      (iii) inner means on said second end portion of said grommet body defining a second stop element for blocking extension of the end portion of the conduit through said second end portion of said grommet body, said inner means also defining an aperture of a second diameter size less than said first diameter size for allowing passage of the electrical wiring emanating from the end portion of the conduit through said second end portion of said grommet body;
   (c) means for securing said end stop grommet to said fitting body, said means for securing including
      (i) wall portions on opposite sides of said fitting body defining a pair of openings and a pair of edges extending along said openings and facing in a first direction toward said first opposite end of said fitting body, and
      (ii) a pair of locking tabs disposed on opposite sides of said first end portion of said grommet body and projecting outwardly therefrom, each of said locking tabs having an edge facing in a second direction opposite from said first direction and toward said second opposite end of said fitting body for making locking engagement with one of said edges on said fitting body upon insertion of said first end portion of said grommet body within said interior bore of said fitting body to said predetermined position within Said interior bore of said fitting body;
   (d) means on said fitting body for gripping the end portion of the conduit so as to hold the conduit end portion within said interior bore of said fitting body; and
   (e) means on said fitting body for connecting said fitting body to the electrical junction box.

2. The assembly as recited in claim 1, wherein said outer means on said second end portion of said grommet body defining said first stop element is spaced from and faces toward said edges on said locking tabs so as to cooperate therewith for holding said grommet body at said predetermined position within said interior bore of said fitting body.

3. The assembly as recited in claim 2, wherein said outer means on said second end portion of said grommet body defining said first stop element is a flange making flush engagement with said fitting body at said second opposite end thereof.

4. The assembly as recited in claim 1, wherein said inner means on said second end portion of said grommet body defining said second stop element is an end wall for retaining the end portion of the conduit within said interior cavity and thereby preventing the end portion of the conduit from entering further into the electrical junction box, said end wall of said grommet body also defining said aperture through said second end portion of said grommet body in the form of a round passage for permitting the electrical wiring emanating from the end portion of the conduit to pass into the electrical junction box.

5. The assembly as recited in claim 4, wherein said end wall has a generally annular configuration and said aperture is defined through said end wall in an offset relation relative to a central point on said end wall.

6. The assembly as recited in claim 1, wherein said first end portion of said grommet body is substantially annular in shape with a longitudinally extending flat side portion.

7. The assembly as recited in claim 6, wherein said first end portion of said grommet body has a longitudinal slit extending therethrough for allowing said first end portion of said grommet body to transversely deform to allow insertion of said first end portion of said grommet body into said interior bore of said fitting body.

8. The assembly as recited in claim 1, wherein said fitting body is substantially cylindrical in shape with a longitudinally extending flat side portion.

9. The assembly as recited in claim 8, wherein said means for connecting said fitting body to the electrical junction box includes a pair of first tabs disposed on opposite sides of said fitting body and extending outwardly therefrom so as to contact an exterior side of a wall of the electrical junction box adjacent to the opening in the electrical junction box after insertion of said second opposite end of said fitting body through the opening and into the electrical junction box.

10. The assembly as recited in claim 9, wherein said means for connecting said fitting body to the electrical junction box further includes a second tab disposed on said fitting body opposite from said flat side portion thereof and projecting outwardly therefrom and in substantially perpendicular relation to said fitting body at said second opposite end thereof, said second tab making flush contact with an interior side of the wall of the electrical junction box adjacent to the opening therein after insertion of said second opposite end of said fitting body through the opening and into the electrical junction box.

11. The assembly as recited in claim 8, wherein said fitting body has a longitudinal slit extending full length through a longitudinal center of said flat side portion thereof for allowing said fitting body to transversely expand and open wide enough across said longitudinal slit for insertion of said first end portion of said grommet body into said interior bore of said fitting body and to contract over and capture said first end portion of said grommet body within said interior bore of said fitting body.

12. The assembly as recited in claim 11, wherein said gripping means includes a grip tab disposed on said fitting body and extending inwardly therefrom opposite from said flat side portion thereof and projecting into said interior bore of said fitting body toward said second opposite end of said fitting body.

13. The assembly as recited in claim 12, wherein said gripping means further includes a spring clip inserted at said first opposite end of said fitting body over said flat side portion thereof, said spring clip having a grip portion disposed at a first end thereof within said interior bore of said fitting body diametrically opposite from said grip tab.

14. The assembly as recited in claim 13, wherein said spring clip further has a pair of opposite ears disposed at a second end thereof, said ears making contact with an interior side of a wall of the electrical junction box adjacent to the opening therein after insertion of said second opposite end of said fitting body through the opening and into the electrical junction box.

15. A conduit connector assembly for attachment of a conduit carrying electrical wires to an electrical junction box, said assembly comprising:
  (a) a fitting body having open first and second opposite ends and an interior bore extending between said first and second opposite ends for receiving therein from said first opposite end an end portion of a conduit carrying electrical wiring which emanates from the end portion of the conduit, said fitting body at said second opposite end being insertable through an opening in an electrical junction box;
  (b) an end stop grommet interfitted with said fitting body, said end stop grommet including
    (i) a grommet body having open first and second end portions, said first end portion of said grommet body being inserted within said interior bore of said fitting body from said second opposite end thereof to a predetermined position within said interior bore of said fitting body, said first end portion of said grommet body being adapted to receive the end portion of the conduit being inserted from said first opposite end of said fitting body,
    (ii) a first stop element on said second end portion of said grommet body and extending outwardly from said grommet body for preventing said grommet body from being inserted into said interior bore of said fitting body beyond said predetermined position therein, and
    (iii) a second stop element on said second end portion of said grommet body disposed inwardly from said first stop element for blocking extension of the end portion of the conduit beyond said second end portion of said grommet body but allowing passage of the electrical wiring emanating from the end portion of the conduit through said second end portion of said grommet body;
  (c) means for securing said end stop grommet to said fitting body;
  (d) means on said fitting body for gripping the end portion of the conduit so as to hold the conduit end portion within said interior bore of said fitting body, said gripping means including
    (i) a grip tab disposed on a first side portion of said fitting body and projecting inwardly therefrom into said interior bore of said fitting body toward said second opposite end of said fitting body, and
    (ii) a spring clip inserted at said first opposite end of said fitting body over a second side portion of said fitting body opposite from said first side portion thereof, said spring clip having a grip portion disposed at a first end thereof within said interior bore of said fitting body substantially opposite from said grip tab; and
  (e) means on said fitting body for connecting said fitting body to the electrical junction box.

16. The assembly as recited in claim 15, wherein said spring clip further includes a pair of opposite ears disposed at a second end thereof, said ears making contact with an interior side of a wall of the electrical junction box adjacent to the opening therein after insertion of said second opposite end of said fitting body through the opening and into the electrical junction box.

17. The assembly as recited in claim 16, wherein said fitting body has a longitudinal slit extending full length through a longitudinal center of said second side portion thereof for allowing said fitting body to transversely expand and open wide enough across said longitudinal slit for insertion of said first end portion of said grommet body into said interior bore of said fitting body and to contract over and capture said first end portion of said grommet body within said interior bore of said fitting body.

18. The assembly as recited in claim 15, wherein said means for connecting said fitting body to the electrical junction box includes a pair of first tabs disposed on opposite sides of said fitting body and extending outwardly therefrom so as to contact an exterior side of a wall of the electrical junction box adjacent to the opening in the electrical junction box after insertion of said second opposite end of said fitting body through the opening and into the electrical junction box.

19. The assembly as recited in claim 18, wherein said means for connecting said fitting body to the electrical junction box further includes a second tab disposed on said fitting body between and spaced from said opposite sides of said fitting body and projecting outwardly therefrom and in substantially perpendicular relation to said fitting body at said second opposite end thereof, said second tab making flush contact with an interior side of the wall of the electrical junction box adjacent to the opening therein after insertion of said second opposite end of said fitting body through the opening and into the electrical junction box.

* * * * *